3,798,131
ASSAY FOR POLYMERIC DNA AS A METHOD FOR DETECTING MALIGNANCY

Donald E. Rounds and K. Sankara Narayan, Altadena, Calif., assignors to Pasadena Foundation for Medical Research, Pasadena, Calif.
No Drawing. Filed Apr. 24, 1972, Ser. No. 246,881
Int. Cl. G01n 31/14
U.S. Cl. 195—103.5 R     7 Claims

ABSTRACT OF THE DISCLOSURE

A method is disclosed for determining polymeric DNA and therewith the presence of cancerous cells. A sample of a biological fluid, such as blood serum, irrigation fluids, etc., is obtained and filtered. A fluorescent substance is admixed with the filtrate which is capable of binding with polymeric DNA, after which the fluorescent intensity of the mixture is determined. The polymerized DNA content of the solution is digested and the fluorescent intensity measured a second time. The difference in the two readings indicates quantitatively the polymerized DNA present, which has been found to be an indication of the presence of cancerous cells.

BACKGROUND OF THE INVENTION

Diagnostic methods for the determination of cancer heretofore have centered on cell morphology, namely, microscopic or other studies of body fluids, etc., aimed at the detection of abnormal cells. One common example is the "Pap" test, in which a cytologic smear of vaginal secretions is studied. Diagnosis based on morphological study, however, leaves much to be desired, especially with respect to its reliability. For example, it is well understood that the "Pap" smear test is characterized by approximately five percent negative error rate, that is, patients having malignant cancers are passed without detection. Moreover, the "Pap" test is only reliable when performed by experienced pathologists, and in the course of obtaining smear samples, the patient is subjected to some discomfort. Additionally, four to five days are typically required to obtain results from the pathological laboratories to which the specimens are submitted.

In view of the foregoing, it is thus clearly desirable to have a test for the detection of cancerous cells which is more comfortable for the patient than the conventional "Pap" test and also one which is capable of having the results obtained concurrently with completion of the examination. Additionally, the "Pap" test is limited with respect to its general utility in that it is diagnostic in nature rather than prognostic, the smear analysis resulting in five diagnoses: normal, dysplasia (presence of abnormal cells but not necessarily indicating malignant tumor), early carcinoma in situ, carcinoma in situ and invasive carcinoma. The "Pap" test does not, however, enable the pathologist to predict whether the detected carcinoma will remain as it is, regress or become invasive.

SUMMARY OF THE INVENTION

The present invention is thus directed to a method of determining the existence of cancerous cells by virtue of detection of polymerized DNA produced thereby. Pursuant to such method, a fluorescent substance which is capable of binding with polymeric DNA is added to a filtrate solution of a biological fluid. The fluorescent intensity of the solution is measured and the polymerized DNA content thereafter digested. The fluorescent intensity of the digested solution is then measured, and the difference in the two readings is recorded, which indicates quantitatively the polymerized DNA content.

DETAILED DESCRIPTION OF THE INVENTION

Pursuant to investigative efforts directed at overcoming the recognized limitations of the "Pap" test, it has been discovered that cancer cells synthesize and excrete an antigenic product consisting of a proteinaceous substance, polymerized DNA and RNA. Antibody tests with animals injected with the antigenic product indicate that such product is characteristic only of malignant cells and is not produced by healthy or normal cells. It has also been found that the antigenic product thus produced and released by the cancer cells is toxic to the growth of cells derived from normal tissues. After obtaining the antigenic product in relatively pure form by differential fractionation, electron micrographs revealed a unique morphology, a characteristic ring-like structure of approximately 100 to 130 angstrom units in diameter.

Subsequent investigations utilizing the enzyme DNase, a family of enzymes which cleave DNA by attacking its deoxyribose linkages, have confirmed the presence of DNA in the antigenic product. While it is known that polymeric DNA may be extracted from cells by a destructive process, it is believed that this is the first occasion in which free polymeric DNA has been detected as a natural synthetic product of living cells. Rather, DNA in polymerized form is only found normally in association with chromosomes and mitochondria inside of cells.

At this point, it should be noted that the investigative work has not been confined to cell culture studies, but has also included skin tissue as well as cervical, uterine, ovarian and other carcinomas. Malignant tissue thus processed in accordance with the invention described herein have demonstrated a polymeric DNA content.

In the method of our invention, the polymeric DNA is determined as follows. A biological fluid such as blood serum, an irrigation fluid, urine or sputum, is filtered, preferably by passing the same through a Millipore filter (a cellulosic filter) having a pore diameter of about 0.22 to 0.45 micron, to remove DNA containing structures, as for example, human or bacterial cells. The fluid is also filtered to remove any mucous which may be present, since that would tend to bind the fluorescent substance and interfere with the reliability of the test results.

The particular biological fluid which is used, of course, depends upon the type of cancer suspected. For example, irrigation fluids are used to irrigate the vagina and tests for cervical, uterine or ovarian cancer, and also to irrigate the colon and stomach. Urine will be used to detect malignancy of the bladder, kidneys or prostrate, while sputum is used for the detection of lung cancer. Similarly, serum is used for the detection of cancer of the breast, kidney, thyroid, skin, and lymphatic involvements, such as Hodgkin's disease. When the biological fluid is an irrigation fluid, it will typically be in the form of a balanced salt solution, such as an 0.85% sodium chloride solution containing 0.01 M magnesium ions and 15 mM. Hepes buffer or 0.03 M Tris buffer to adjust the pH within the range of from about 6.0 to about 7.6. Preferably, the pH is adjusted to about 7.4. In place of the indicated salt solution, other commercially available solutions may also be used, including Hank's solution, Gey's solution, Earle's and Baxter's solutions.

After the biological fluid has been filtered as described previously, it is admixed with a fluorescent substance which is capable of binding with polymeric DNA. Illustrative examples of such substances are fluorescent dyes such as ethidium bromide, 3,5-diaminobenzoic acid, acridine orange and berberine sulfate. As explained by Le Pecq and Paoletti in Analytical Biochemistry 17, 100–107 (1966), the fluorescent substance, ethidium bromide in the particular case of the reference, has been found to bind itself to the polymeric DNA and in so doing its fluorescent quantum efficiency is increased. In the case of ethidium bromide, Le Pecq and Paoletti report that the increase is by a factor of 20 to 25 times. This in turn causes a corresponding increase in the intensity of fluorescence emission by a factor between 50 and 100 times.

The procedure generally followed in admixing the fluorescent substance with the filtrate solution and determining the fluorescent intensity of the resulting admixture is that described in the aforenoted article by Le Pecq and Paoletti, which is hereby incorporated by reference herein. In general, a sufficient quantity of the fluorescent substance is admixed with the filtrate solution to give a concentration of the fluorescent substance in the total solution for detection of polymeric DNA concentrations of up to about 10 micrograms per milliliter of solution. For example, in the case of ethidium bromide, approximately 5 to about 10 micrograms of ethidium bromide per milliliter of the total filtrate solution is sufficient to detect polymeric DNA in the indicated concentrations. Most commonly, approximately 5 micrograms of ethidium bromide per milliliter of the total filtrate solution is used, which is siutable for detection of polymeric DNA concentration ranging from 0.01 microgram per milliliter to 1 microgram per milliliter.

As indicated previously, the fluorescence intensity is preferably measured following the procedure described by Le Pecq and Paoletti, since that procedure permits the determination to be made easily and reliably. The actual measurements of the fluorescent intensity can be made utilizing any commercially available spectrofluorometer, as for example, a Zeiss spectrophotometer utilizing a fluorescent attachment. As explained by Le Pecq and Paoletti, since the maximum fluorescence emission spectrum of both free and bound ethidium bromide is at a frequency of about 590 nm., the fluorescence emission of the ethidium bromide containing filtrate solution should be measured at that frequency, using an excitation frequency of approximately 545 nm. After the fluorescent intensity has thus been measured, it is recorded, for further reference and use as described herein.

It should also be mentioned that alternative procedures can be utilized to admix the biological fluid and the fluorescent substance. For example, the biological fluid may be added to a premeasured quantity of the dried fluorescent substance in the spectrofluorometer cuvette. Similarly, an appropriate quantity of the biological fluid may be added to a solution of the fluorescent substance, as for example, the addition of about 0.5 milliliters of the biological fluid to 0.5 milliliters of a 10 microgram per milliliter ethidium bromide stock solution.

After the fluorescent intensity of the fluorescent filtrate solution has been measured, the polymeric DNA content is digested and a second fluorescent intensity measurement undertaken. Digestion of the polymerized DNA content is obtained by addition of the enzyme DNase to the fluorescent filtrate solution. This enzyme is selective for DNA and thus will not alter the fluorescence produced by the fluorescent substance or any extraneous factors which may have contributed to the original fluorescent intensity measurement. Insofar as the quantity of enzyme is concerned, sufficient enzyme must be used to digest the entire polymerized DNA content of the filtrate solution. Generally, this is accomplished by the addition of about 25 to about 125 active units of the enzyme. To obtain the indicated quantity of active units of DNase, approximately 0.01 to about 0.05 milliliters of DNase having an activity of about 2500 units of the enzyme per microgram may be used. One specific example which has been found satisfactory is the addition of 0.25 milliliter of 1 mg./ml. DNase containing 0.01 M magnesium ions, buffered with 0.03 M Tris buffer, the enzyme being a commercial product of Worthington Biochemical Corporation, reported to be free of RNase and to have an activity of 2500 units of DNase/mg. To digest the polymerized DNA content of the filtrate solution, the DNase should be maintained in contact with the solution for a period of time ranging from about 5 to about 30 minutes. The exact time which is necessary, of course, depends upon the concentration of the DNase which is used, the greater the activity of the DNase, the less time required for digestion.

After digestion, the fluorescent intensity of the solution is again measured, preferably following the procedure previously described. Since the polymerized DNA content is no longer present and the bound fluorescent substance has been released, an associated reduction in fluorescence intensity will also occur. By recording the second intensity measurement and comparing the same with the first measurement, a quantitative indication of the polymerized DNA content is thus accurately obtained. By the same token, the quantitative polymerized DNA determination is an indication of the condition of a patient, that is, whether cancerous cells are present and to what extent, the greater the net fluorescent intensity reading, the more advanced or serious the condition.

The invention will be better understood by reference to the following specific but illustrative examples.

Example I

In this example, surgical biopsy specimens (from the tissue source indicated in the following table) were incubated in a 3 milliliters of a serum-free tissue culture medium consisting of purified water, amino acids, vitamins and minerals, at 37° C. for 24 hours. The culture medium was thereafter filtered through a Millipore filter having a pore diameter of 0.22 micron to filter out the DNA containing structures and mucous. Approximately 5 micrograms per milliliter of ethidium was then admixed with the filtrate and the fluorescence intensity subsequently measured utilizing a spectrofluorometer at an excitation frequency of 545 nm., the measurement obtained at a frequency of 590 nm. Thereafter, 0.25 milliliter of 1 mg./ml. DNase containing 0.01 M of magnesium ions, buffered with 0.03 M Tris buffer (the DNase having an activity of 2500 units per mg.) was added to the fluorescent containing filtrate solution. After approximately 15 minutes, a second reading was taken, recorded and compared with the first reading. The biopsy specimens were found to have variable amounts of polymerized DNA present, as shown in Table I which follows.

TABLE I

| Tissue source | Tissue type | Number of specimens | Micrograms DNA/ mg. tissue | |
|---|---|---|---|---|
| | | | Range | Average |
| Human skin | Normal skin | 11 | 0 | 0 |
| | Benign tumor (*Verruca vulgaris*). | 9 | 0–0.09 | 0.03 |
| | Premalignant (Actinic Keratosis). | 12 | 0–1.69 | 0.35 |
| | Malignant tumors (Basal Cell Ca). | 29 | 0.13–3.00 | 0.92 |
| | Malignant tumors (Squamous Cell Ca). | 13 | 0.44–5.10 | 1.70 |
| Human female | Normal cervix | 7 | 0 | 0 |
| | Premalignant dysplasias | 15 | 0–1.90 | 0.64 |
| Urogenital | Malignant tumors (Endometrial Ca). | 7 | 0.02–2.10 | 0.62 |
| Tract | (Cervical Ca—in situ) | 13 | 0.11–4.86 | 1.60 |
| | (Invasive Cervical Ca) | 14 | 0.90–22.90 | 4.46 |

Example II

A comparison of the method of the present invention with the well known "Pap" test was undertaken. As indicated in Table II, patients were tested both by the "Pap" test and the method described herein utilizing vaginal irrigation fluid as the biological fluid. The irrigation fluid was a balanced salt solution of 0.85% sodium chloride containing about 0.01 M magnesium ions and 0.03 M Tris buffer, adjusted to a pH of about 7.4. Approximately 3.0 milliliters of the salt solution were used to obtain the vaginal samples. The irrigation fluid was filtered through a Millipore filter having a pore diameter of 0.22 micron to remove cells, microorganisms and mucous. Aproximately 0.5 milliliter of the balanced salt solution was then mixed with an equal volume of 10 microgram per milliliter ethidium bromide stock solution, and the fluorescence intensity measured as previously described. After the fluorescence intensity was recorded, approximately 0.25 milliliter of 1 mg./ml. DNase (an activity of 2500 units per microgram) was added to the fluorescent filtrate solution. After approximately 15 minutes, a second fluorescent intensity reading was taken and recorded. The net readings are shown in Table II which follows.

TABLE II

| "Pap" test classification | Number of specimens | $\mu$g. DNA/ml. fluid | |
|---|---|---|---|
| | | Range | Average |
| Normal | 215 | 0–0.25 | 0.006 |
| Dysplasia | 56 | 0–1.25 | 0.02 |
| Cervical carcinoma, in situ | 9 | 0.32–2.10 | 0.86 |
| Invasive Cervical Ca | 6 | 3.80–10.00 | 6.00 |

It will be seen from Table II that the net intensity readings increase in a manner corresponding to the character of the condition, that is, greater net readings are obtained for patients suffering from invasive cancer than those diagnosed by the "Pap" test as normal, etc. Our comparative studies with the "Pap" test have additionally shown that patients indicated as dysplastic by "Pap" testing gave net intensity readings corresponding in magnitude with those obtained from patients characterized by "Pap" testing as "carcinoma in situ." Subsequent investigation of such dysplastic patients have indicated malignant carcinomas, which further underlines the prognostic advantages of the present method. It is thus apparent that the method described herein may advantageously be utilized as a predictive back-up examination for the more subjective "Pap" test.

In Table III, the results of examination of patients classifiable as non-malignant, malignant and post-surgical are shown. The post-surgical patients are those who have undergone surgery to correct malignant carcinomas. As present invention in that non-malignant and post-surgical will be seen, the results there set forth further confirm the patients yielded low net intensity readings, whereas malignant patients yielded significantly higher readings.

TABLE III

| | Patients (number) | $\mu$g. DNA/ml. (serum) | |
|---|---|---|---|
| | | Range | Average |
| Physical condition: | | | |
| Non-malignant | 53 | 0–0.005 | 0.002 |
| Malignant | 19 | 0.01–0.085 | 0.025 |
| Post-surgical | 18 | 0–0.005 | 0.001 |

It should be mentioned that when blood serum is used as the biological fluid, good results are obtained when approximately 5 milliliters of venous blood is collected and the blood permitted to clot, after which the cell-free serum is collected, as for example, with a pipet. The serum is thereafter filtered and processed as previously described.

It will be appreciated from the foregoing that the method of the present invention reliably detects an antigenic product synthesized by a wide variety of malagnant cells and thus can serve as a diagnostic criterion for malignancy. Additionally, the test is more comfortable for the patient than the "Pap" test and is susceptible to yielding the results substantially immediately (only about 5 minutes is normally required). By the same token, the method can be performed reliably by relatively non-specialized technicians.

We claim:

1. A diagnostic method of determining the existence of cancerous cells comprising filtering a biological fluid selected from the group consisting of blood serum, irrigation fluids, urine and sputum to remove cells, microorganisms and mucous therefrom, admixing with the filtrate solution a fluorescent substance capable of binding with polymeric DNA, measuring the fluorescent intensity of such solution, digesting the polymerized DNA content of such fluorescent containing solution by the addition thereto of the enzyme DNase, and thereafter measuring the fluorescent intensity of the digested solution and recording the difference in intensity measurements to determine the polymerized DNA content of said fluid and thereby determine the existence of cancerous cells in said fluid.

2. The method of claim 1 in which the fluorescent substance is selected from the group consisting of ethidium bromide, 3,5-diaminobenzoic acid, acridine orange and berberine sulfate.

3. The method of claim 2 in which the fluorescent substance is ethidium bromide present in a sufficient quantity to give a concentration of from about 5 to about 10 micrograms of ethidium bromide per milliliter of the total filtrate solution.

4. The method of claim 1 in which about 25 to about 125 active units of the enzyme DNase is added to the fluorescent containing filtrate, and the enzyme is maintained in the fluorescent containing filtrate for approximately 5 to about 30 minutes.

5. The method of claim 1 in which the biological fluid is an irrigation fluid comprising a salt solution having a pH of from about 6.0 to 7.6.

6. The method of claim 5 in which the salt solution has a pH of about 7.4.

7. A diagnostic method of determining the existence of cancerous cells comprising filtering a biological fluid to remove cells, microorganisms and mucous therefrom, admixing with the filtrate solution a fluorescent substance capable of binding with polymeric DNA selected from the group consisting of ethidium bromide, 3,5-diaminobenzoic acid, acridine orange and berberine sulfate, measuring the fluorescent intensity of such solution, digesting the polymerized DNA content of such fluorescent containing solution by the addition thereto of about 25 to about 125 active units of the enzyme DNase and maintaining the enzyme in such fluorescent containing solution for approximately 5 to about 30 minutes, and thereafter measuring the fluorescent intensity of the digested solution and recording the difference in intensity measurements to determine the polymerized DNA content of said fluid and thereby to determine the existence of cancerous cells in said fluid.

References Cited

"Chemical Abstracts," 67: 305Hc (1967).
"Analytical Abstracts," 15: 383 (1967).

A. LOUIS MONACELL, Primary Examiner

M. D. HENSLEY, Assistant Examiner